United States Patent Office 3,132,069
Patented May 5, 1964

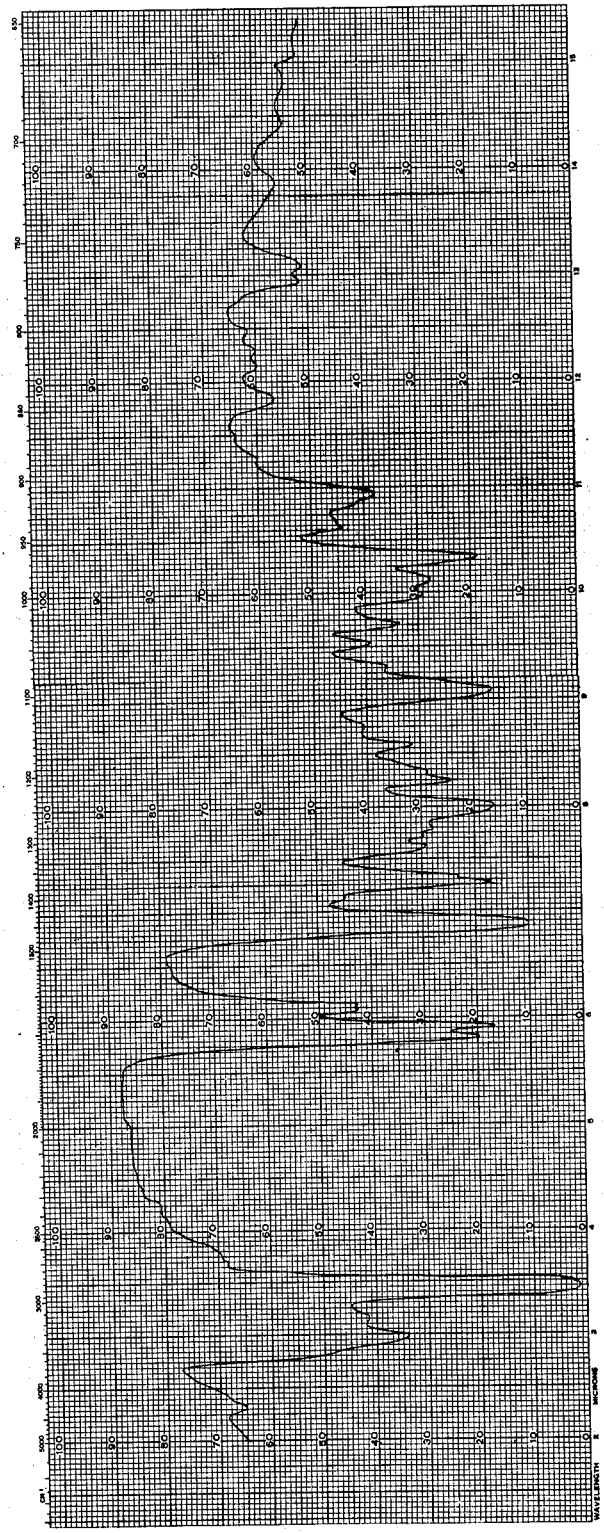
Hiroichi YAMAMOTO
Motoo SHIBATA
Akira MIYAKE
Satoshi HORII
Ryozo HATTA
Ikuo SUMINA
INVENTORS

---

3,132,069
ANTIFUNGAL ANTIBIOTIC HUMIDIN FOR AGRICULTURAL USES
Hiroichi Yamamoto, Kobe, Motoo Shibata, Toyonaka, Akira Miyake, Nishinomiya, and Satoshi Horii, Ryozo Hatta, and Ikuo Sumina, Kyoto, Japan, assignors to Takeda Pharmaceutical Industries, Ltd., Osaka, Japan
Filed Jan. 20, 1958, Ser. No. 710,084
Claims priority, application Japan Jan. 24, 1957
6 Claims. (Cl. 167—22)

The present invention relates to a control agent for plant diseases with the aid of *Streptomyces humidus*.

*Streptomyces humidus* (IFO–3520, ATCC–12760) has been found to be not only a dihydrostreptomycin-producing strain, but also to product a new antibiotic which has been named Humidin, and is so referred to hereinafter.

As indicated, the aforementioned *Streptomyces humidus* strain has been deposited in the Institute for Fermentation, Osaka, Japan under the designation IFO–3520 and in the American Type Culture Collection, Washington, D.C. under the designation ATCC–12760.

Bacteriological properties of the said strain are shown in the following Table 1, the colors indicated by the abbreviation "Rdg." being based upon "Ridgway's Color Standards and Color Nomenclature."

TABLE 2
Carbon Utilization of *Streptomyces humidus* Nov. Sp. IFO–3520

| | |
|---|---|
| d(+)-Xylose | ++ |
| l(+)-Arabinose | +++ |
| l(+)-Rhamnose | +++ |
| d-Fructose | +++ |
| d-Galactose | +++ |
| Sucrose | — |
| Maltose | +++ |
| Lactose | ++ |
| d(+)-Raffinose | — |
| Inulin | — |
| d-Mannitol | +++ |
| d-Sorbitol | — |
| Dulsitol | — |
| dl-Inositol | — |
| Salicin | ++ |
| Na-acetate | — |
| Na-citrate | ± |
| Na-succinate | ± |
| Control | — |

— :No growth.
± :Growth doubtful.
+ :Poor growth.
++ :Fair growth.
+++ :Good growth.

TABLE I
Cultural Characteristics of *Streptomyces humidus* Nov. Sp. IFO–3520

| Medium | Cultural characteristics | | | Remarks |
|---|---|---|---|---|
| | Growth | Aerial mycelium and spores | Soluble pigment | |
| Czapek's agar | Colorless | White | None | |
| Glucose asparagine agar | do | White to Smoke-gray (Rdg. XLVI, 21'''''-d) or Vinaceous buff (Rdg. XL, 17''-d). | | Abundantly interspersed with small moist black patches which gradually spread over the whole surface. Reverse Cream-buff (Rdg. XXX, 19''-d) or Cartridge-buff (Rdg. XXX, 19''-f), later becoming Chamois (Rdg. XXX, 19''-b). |
| Starch agar | do | White to Pale smoke gray (Rdg. XLVI, 21'''''-f). | None | Reverse Cream-buff (Rdg. XXX, 19''-b). Hydrolysis slight. |
| Calcium malate agar | Colorless, later becoming Buff-yellow (Rdg. IV, 19-d). | Scanty White | do | |
| Glycerin nitrate agar | Colorless | do | do | |
| Dextrose nitrate agar | do | do | do | |
| Bouillon agar | do | None | do | |
| Gelatin | do | do | do | Modern liquefaction. |
| Potato plug | do | White to Smoke gray (Rdg. XLVI, 21'''''-d). | do | Moist Black patches observed. |
| Carrot plug | do | do | do | |
| Yeast extract agar | do | White to Light drab (Rdg. XLVI, 17''''-b). | do | Partially moistened. |
| Whole egg | do | White | do | |
| Milk | do | do | do | Peptonization slowly. |
| Glycerin-asparaginate agar | do | White to Smoke gray (Rdg. XLVI, 21'''''-d). | do | |
| Peptone nitrate broth | do | do | do | Nitrate reduction. |

Aerial mycelium of this strain shows spiral, 0.8–1.2μ, conidia oval, 1–1.5μ x 1.5–2μ.

The carbon utilization of the aforesaid strain, determined according to the method of Pridham, is shown in the following table.

Various nutrients which are usable for the cultivation of microorganisms in general may be employed for the production of Humidin by cultivation of *Streptomyces*

*humidus*. As carbon source, there can be used, for example, starch, lactose, dextrin, glycerin, maltose, etc., and as nitrogen source there can be used various organic and inorganic nitrogen-containing substances such for example as soybean protein, meat extract, peptone, casein, yeast, cornsteep liquor, powdered peanut, nitrates, urea, ammonium salts, etc. A small quantity of an inorganic salt or trace element may be added. Besides these substances, the mycelium of the penicillium microorganisms or its processed products may be used as a nutrient source.

To manufacture Humidin industrially, the culturing is advantageously carried out by aerobical submerged culture in a medium prepared from the above-mentioned nutrients. The material can, however, also be prepared on a solid medium or by surface culture. Nearly neutral pH, a temperature of about 23° to 30° C. and a culture time of about 2 to 7 days are most suitable for the production of the new antibiotic.

The culture broth thus obtained contains dihydrostreptomycin and Humidin, and the former is chiefly contained in the liquid part and the latter in the mycelium, the two substances being generally produced simultaneously. It is a characteristic feature of Humidin that it is essentially accumulated in the mycelium. There appears to be no correlation between the quantity of the mycelium and that of the dihydrostreptomycin produced.

Humidin is isolated from the culture broth, especially from the mycelium. Therefore, it is advantageous for the isolation of Humidin to separate the mycelium and then to isolate Humidin from the mycelium. For the isolation of Humidin from the filtered broth, various characteristics of the antibiotic are utilized. For example, differences between Humidin and impurities in solubility, distribution coefficient, adsorbability, ionic bonding strength, etc. are utilized for the purpose.

Humidin is readily soluble in acetone, dioxane, acetic acid esters, hot alcohol, etc. and an acid pH enhances this solubility. Humidin is therefore advantageously isolated as follows, for example. The mycelium is extracted with one of the above solvents, the extract, after being concentrated, is acidified and treated with a hydrophilic organic solvent which can readily dissolve Humidin, such as acetic acid esters, and the solution is concentrated in vacuo, or the solution is made alkaline with alkali hydroxide, whereupon Humidin separates out. Thus, crude or fairly pure Humidin can be isolated comparatively readily by utilizing differences between the substance and impurities in solubility and distribution coefficient between two solvents. In general, the above method is the most convenient for the purification of Humidin. However, Humidin can also be separated from impurities by adsorption with an adsorbent and subsequent elution. As adsorbent there can be used, for example, active carbon, diatomaceous earth, alumina, etc. Ion exchangers are also conveniently employed for the same purpose.

The above methods are effected batchwise in the form of adsorption chromatography, partition chromatography, counter current distribution and the like. Besides, such methods as precipitation with a suitable precipitant, salting out and dialysis may be employed. These methods are employed separately or in combination, and once or repeatedly. Further, adjustment of pH of the solution facilitates the separation of Humidin.

The Humidin thus obtained and purified by recrystallization from a solvent such as ethanol has the following properties:

(1) Melting point: 145–146° C. (decomp.).
(2) Crystal form: Hexagonal plate (colorless).
(3) Analytical values are as shown e.g. below, and nitrogen, halogen and sulfur could not be detected by qualitative tests:

|  | C, percent | H, percent |
|---|---|---|
| No. 1 | 63.51 | 8.66 |
| No. 2 | 63.42 | 8.52 |
| No. 3 | 63.36 | 8.32 |
| No. 4 | 63.03 | 8.31 |

(4) Molecular weight: 550±50 (by Barger method), 823±10 (from X-ray goniometry and density).

The empirical formula $(C_{12}H_{20}O_4)_n$ corresponds to the above data.

(5) Optical rotation:
$[\alpha]_D^{34} = -6°$ (c.=1, ethanol)
$[\alpha]_D^{25} = -10°$ (c.=1, acetone)
$[\alpha]_D^{25} = -8°$ (c.=1, dioxane)

(6) IR-spectrum: It was measured in the form of Nujol mull, using a prism made of NaCl. The curve is shown on the accompanying sheet of the drawing. The bands of the infrared spectrum follow:

| Absorption band | Relative intensity[1] | Absorption band | Relative intensity[1] |
|---|---|---|---|
| 2.99 | S | 9.54 | W |
| 3.15 | W | 9.71 | M |
| 5.82 | S | 9.98 | M |
| 5.92 | S | 10.25 | M |
| 6.07 | M | 10.34 | S |
| 6.13 | M | 10.63 | W |
| 7.63 | W | 10.94 | M |
| 7.71 | W | 11.84 | M |
| 7.79 | W | 12.15 | W |
| 8.01 | S | 12.28 | W |
| 8.25 | M | 12.47 | W |
| 8.40 | Sh | 12.93 | M |
| 8.59 | M | 13.07 | M |
| 8.75 | W | 13.87 | W |
| 9.10 | S | 14.42 | W |
| 9.30 | W | | |

[1] S: strong; M: medium; W: weak; Sh: shoulder.

UV-spectrum: It was measured as alcoholic solution. The adsorption maxima were found in the vicinities of 245 mμ and 285 mμ.

(7) Color reaction:
(i) The aqueous or alcoholic solution of Humidin gives no color with ferric chloride.
(ii) It gives orange-red or red-purple color with concentrated sulfuric acid.
(iii) It is negative to Fehling solution both under cold and hot conditions.
(iv) Its acetone solution discolors potassium permanganate solution, and its ethereal solution gradually discolors bromine.

(8) Solubility: It is readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride.

(9) $R_f$-value in paper partition chromatography (By ascending method, using strips, 2.0 x 45 cm. of Toyo filter paper No. 51):

| Solvent system | Time (hours) | $R_f$ |
|---|---|---|
| n-Butanol saturated with water | 15 | 0.88–0.94 |
| n-BuOH·AcOH·H₂O (2:1:1) | 15 | 0.96–0.97 |
| n-BuOH·pyridine·H₂O (1:0.6:1) | 15 | 0.92–0.97 |
| 3% NH₄Cl solution | 3 | 0.00 |
| 50% aqueous acetone | 7 | 0.79–0.80 |
| Benzene·AcOH·H₂O (2:2:1) | 7 | 0.92–0.93 |
| Water saturated with n-BuOH | 8 | 0.13 |

(10) Antimicrobial spectrum: The antimicrobial spectrum was determined by the so-called agar dilution method as follows:

| Temperature | Medium | Test organism used |
|---|---|---|
| 37° C | Nutrient agar | Bacteria. |
| 37° C | Agar medium containing 1% of glycerol. | Mycobacteria. |
| 27° C | Agar medium containing 1% of glucose. | Fungi.[1] |

[1] Candida, Cryptococcus and Trichophyton were incubated at 37° C, though they belong to fungi.

(11) Influence of pH of the medium on the antibiotic activity: When the activity of Humidin is assayed by the agar dilution method with *Saccharomyces cerevisiae* on an agar medium containing 1% of glucose (pH 6 to 8), it shows strong antibiotic activity at alkaline pH as shown below.

| pH of medium | 6 | 7 | 8 |
|---|---|---|---|
| U./mg | 5,000 | 15,000 | 50,000 |

(12) Influence of other factors on the antibotic activity: Addition of dihydrostreptomycin sulfate in a dilution of 10 mg./ml. or cysteine in a dilution of 1/100 mole to the medium exerted no influence on the antibiotic activity, but addition of 1-ascorbic acid in a dilution of 1/100 mole decreased the activity to about 1/7.

(13) Toxicity: The toxicity of Humidin to mice weighing 14–15 g. is as follows. When injected subcutaneously with 50–100 mg./kg. of Humidin, all the animals died, but with 25 mg./kg. 50% of them survived. $LD_{50}$ was lower than 1 mg./kg. when injected intraperitoneally, and 50 mg./kg. when administered orally.

The strong activity of Humidin against many phytopathogenic fungi such as sclerotial fungi (e.g. *Sclerotinia sclerotiorum*), anthracnose fungi (e.g. *Colletotrichum glycines* and other microorganisms of the Colletotrichum species), and smut fungi (e.g. *Ustilago zeae*) renders Humidin particularly useful in the elimination of fungal plant diseases due to the said fungi, as for example sclerotinia rot of crucifiers, smut disease of corn, and anthracnose of soybean and the like. Moreover, the Humidin can be employed in the crude state and even without isolation from the mycelium if desired.

The following examples set forth illustrative methods of obtaining the Humidin.

EXAMPLE 1

| | Percent by weight |
|---|---|
| Cornsteep liquor | 3.0 |
| Starch | 3.0 |
| Peptone | 0.5 |
| Calcium phosphate | 0.1 |
| Magnesium sulfate | 0.05 |
| Calcium carbonate | 0.3 |

100 l. (liters) of an aqueous medium (pH 6.5–7.0) prepared with the above substances is placed in a tank and, after being sterilized by heating, inoculated with a strain (IFO–3520) of *Streptomyces humidus*. The cultivation is effected aerobically at 27° C.±1° C. for 4 days with stirring. The mycelium produced is separated by filtration, washed with water and pressed as dry as possible (20 kg.). The wet mycelium is extracted with about 40 l. of acetone at 40° C. for one hour with stirring, the mycelium is filtered off, and the acetone in the extract (ca. 40 l.) is distilled at low temperatures, leaving about 7 l. of a concentrated aqueous solution. After adjusting its pH to 2.0–3.0 with hydrochloric acid, the aqueous solution is extracted twice with ¼ and ⅛ its volume of ethyl acetate. N-NaOH is added to the combined extracts until the active substance no more separates in the form of emulsion, the ethyl acetate layer is separated, and the pH of the emulsion is adjusted to 2.0–3.0 with hydrochloric acid, whereupon Humidin separates out in crystalline form. The product recrystallizes from ethyl alcohol in hexagonal plates, M.P. 145–146° C. (decomp.). The yield is 9.7 g.

EXAMPLE 2

If the content of the Humidin in the broth is too low to isolate it by the method of Example 1, it is separated as follows:

500 ml. of the concentrated ethyl acetate solution (the content of Humidin is about 3 mg./ml.) obtained as in Example 1 is poured into a glass column with a diameter of 5 cm., packed with 100 g. of active carbon, and the active carbon is eluted with 1500 ml. of ethyl acetate. The resulting eluate contains practically no Humidin. The active carbon is again eluted with 2000 ml. of 95% ethanol and the eluate is concentrated in vacuo at low temperature, when Humidin separates out. From ethanol it crystallizes in plates, M.P. 145–146° C. The yield is ca. 200 mg. (40%). If the quantity of active carbon is decreased, the yield of Humidin is apt to rise.

The following examples set forth illustrative methods of testing the effectiveness of Humidin and of controlling plant diseases.

EXAMPLE 3

To determine the antifungal spectrum of Humidin, agar media containing 1% of glucose and Humidin in various dilutions were solidified in Petri dishes. On the other hand, various microorganisms to be tested, incubated on potato-sucrose agar slopes, were rubbed with a sterilized loop adding ca. 3 ml. each of distilled water. The mixtures thus prepared were streaked on the solid media in the Petri dishes with a loop and incubated at 27° C. in an incubator. The results obtained after 48 and 120 hours are shown in Table 3. Incidentally, the minimum concentration in the table means the quantity (mcg./ml.) of Humidin contained in 1 ml. of the section where the growth of the microorganisms was completely inhibited when observed with the naked eye.

TABLE 3

| No. | Microorganism name | Minimum concentration for complete inhibition of growth | | Damage caused from the microorganism | |
|---|---|---|---|---|---|
| | | 48 hours, mcg./ml. | 120 hours, mcg./ml. | Host plant | Name of disease |
| I | Hypochnus sasakii | 5 | 10 | Rice plant | Sheath spot. |
| II | Piricularia oryzae | 100 | >100 | do | Blast. |
| III | Helminthosporium sigmoideum | 100 | >100 | do | Stem rot. |
| IV | Rhizoctonia solani | >100 | >100 | Egg plant | Damping-off. |
| V | Corticium centrifugum | >100 | >100 | Broad bean | Southern sclerotial blight. |
| VI | Sclerotinia sclerotiorum | | 10 | Crucifers | Sclerotinia rot. |
| VII | Rhizopus nigricans | 5 | 5 | Sweet potato | Soft rot. |
| VIII | Ustilago zeae | 0.2 | 0.5 | Maize | Smut disease. |
| IX | Glomerella cingulata | 100 | 100 | Grape | Anthracnose. |
| X | Gleosporium laeticolor | | 0.5 | Peach | Do. |
| XI | Colletotrichum lagenarium | 0.5 | 0.5 | Cucumber | Do. |
| XII | Colletotrichum glycines | <0.1 | 0.5 | Soybean | Do. |
| XIII | Colletotrichum atramentarium | 100 | >100 | Potato | Do. |

EXAMPLE 4

This relates to rests on living plants.

(A) Test on *Hypochnus sasakii*—

(i) Sheath spot of the rice plant: *Hypochnus sasakii* is known as a microorganism to cause sheath spot of the rice plant. It is also parasitic on such useful plants as millet, barley, soybean, red bean, kidney bean, burdock, camphor, corn, peppermint and peanut. Although the symptom is different according to the kind of the host plants, it generally blights the leaf and stem.

Test on the microorganism was conducted, using the rice plant as test plant. Race of the rice plant tested:

(A) Norin-22
(B) Higashiyama-41
(C) Asahi-4
(D) Senbon-Asahi

Of the four races (A) and (B) are susceptible to sheath spot, and (C) and (D) are resistant.

Method: The test plants were planted in unglazed pots (3 inches in diameter), and after the height of the glasses reached 50–60 cm., they were divided into groups with 10–30 pots each. The plants were sprayed with the test chemical, dried in the air, and then inoculated with the pathogene. Observation was conducted after 5–7 days.

The inoculation was effected as follows: Hyphae or sclerotia of *Hypochnus sasakii* was inoculated on fragments of rice straw and incubated at 30° C.±1° C. in a thermostat for about a week. The fragments were inserted in leaf sheaths of the test plants and the test plants, after being kept at 30°±1° C. in a moist chamber for 48 hours, were transferred into a green house at 24–35° to cause the disease. In some cases, agar blocks on which *Hypochnus sasakii* had been incubated for 2–3 days were used instead of the fragments of rice straw.

The content of Humidin in the agent was 10 mcg./ml., or 100 mcg./ml., and 5 or 10 ml. of the agent was sprayed per pot.

In the Wagner pot test, 50 ml. of 10 mcg./ml., 50 mcg./ml. and 100 mcg./ml. content was sprayed per pot.

Results:

TABLE 4

[Higashiyama-41—race (B)]

| Treatment | Sprayed volume (ml./pot) | Height of grass (cm.) | No. of infected plants | No. of uninplants fected | Protective effect, percent |
|---|---|---|---|---|---|
| Control | | 68.5 | 6 | 1 | 0 |
| 10 mcg./ml | 10 | 66.2 | 1 | 9 | 88.3 |
| 100 mcg./ml | 5 | 66.4 | 0 | 0 | 100. |

TABLE 5

[Norin-22—race (A)]

| Treatment | Sprayed volume (ml./pot) | No. of infected plants | No. of uninfected plants | Protective effect, percent |
|---|---|---|---|---|
| Control | | 19 | 8 | 0 |
| 10 mcg./ml | 5 | 8 | 20 | 59.8 |
| 100 mcg./ml | 10 | 3 | 25 | 84.8 |

TABLE 6

Senbon-Asahi—race (D)]

| Treatment | Sprayed volume (ml./pot) | Height of grass (cm.) | No. of infected plants | No. of uninfected plants | Protective effect, percent |
|---|---|---|---|---|---|
| Control | | 60.2 | 18 | 2 | 0 |
| 10 mcg./ml | 10 | 60.5 | 10 | 10 | 44.4 |
| 100 mcg./ml | 10 | 59.4 | 2 | 18 | 88.9 |

Results of Wagner-pot test two days after spraying of Humidin:

TABLE 7

[Senbon-Asahi—race (D)]

| Treatment | Sprayed volume (cc./pot) | No. of pot | No. of infected plants | No. of observed plants | Infected percentage, percent | Preventive effect, percent |
|---|---|---|---|---|---|---|
| Control | | 6 | 133 | 246 | 54.1 | 0 |
| 10 mcg./ml | 50 | 6 | 74 | 255 | 29.0 | 46.4 |
| 50 mcg./ml | 50 | 6 | 58 | 233 | 24.9 | 54.0 |
| 100 mcg./ml | 50 | 6 | 42 | 242 | 17.4 | 67.8 |

(ii) Test by Kosaka's method: This method comprises spraying the agent on the surface of the leaf of soybean plant, inoculating *Hypochnus sasakii*, and measuring the diameter of the infected region. The test was conducted as follows. A leaf of soybean plant was sprayed with the agent and, after being dried in the air, put on a wet sheet of filter paper placed in a Petri dish with a diameter of ca. 9 cm. A small glass plate was put in the middle of the leaf, an agar block on which *Hypochnus sasakii* had been cultivated beforehand was placed on the glass plate, and the glass dish was left standing at 28–30° C. in a thermostat. And after 24 hours the diameter of the infected region was measured. The efficacy of the agent was judged from the following coefficients.

Diameter of region (D, cm.): Factor
- D=0 — 0
- 1≧D>0 — 1
- 2≧D>1 — 2
- 3≧D>2 — 3
- 4≧D>3 — 4
- D>4 — 5

The results of the test are shown in Table 8.

TABLE 8

| Treatment | Sprayed volume (ml./ treatment) | Factor | | | | | | Preventive effect, percent | Remarks |
|---|---|---|---|---|---|---|---|---|---|
| | | 0 | 1 | 2 | 3 | 4 | 5 | | |
| Control | | | | | | 3 | 17 | 0 | |
| 10 mcg./ml | 25 | 8 | 1 | 6 | 3 | 2 | | 69.1 | Sprayed on the surface of the leaf. |
| 10 mcg./ml | 25 | 2 | 1 | 2 | 3 | 3 | 9 | 26.8 | Sprayed on the reverse of the leaf. |
| 100 mcg./ml | 25 | 13 | 1 | 3 | 3 | | | 83.5 | Sprayed on the surface of the leaf. |
| 100 mcg./ml | 25 | 1 | | 3 | 3 | 2 | 11 | 19.6 | Sprayed on the reverse of the leaf. |

From the results mentioned above Humidin was found to be effective for the plant diseases caused by *Hypochnus sasakii*.

(B) Test on *Colletotrichum lagenarium*—

*Colletotrichum lagenarium* is a fungus extensively parasitic on various cucurbitaceous plants. It is the source of anthracnose which causes spots, shot holes and softening in leaves, vines and fruits.

Method: Four leaves of the cucumber test plant, which belongs to the race susceptible to the disease and had 4 or 5 main leaves, were used as the test subject. The four leaves were sprayed with the agent and after drying, inoculated with the microorganism. The plant was left standing in a moist chamber of 30° C. overnight and then transferred to a greenhouse of 24-35° C. and observed after a week. The results are shown in Table 9.

TABLE 9

| Treatment | Volume sprayed (ml./pot) | Number of regions per leaf | | | | Infection percentage, percent | Ratio, percent | Protective effect, percent |
|---|---|---|---|---|---|---|---|---|
| | | 2nd leaf | 3rd leaf | 4th leaf | 5th leaf | | | |
| Control | | 2.3 (6) | 5.4 (12) | 4.9 (16) | 0.8 (4) | 54.0 | 100 | 0 |
| 10 mcg./ml | 10 | 0.5 (2) | 0.9 (14) | 0.9 (14) | 0 (8) | 9.0 | 16.7 | 83.3 |
| 100 mcg./ml | 10 | 0.3 (4) | 0.3 (15) | 0.1 (18) | 0 (8) | 3.0 | 5.6 | 94.4 |

(In the table, the infection percentage is the value obtained by multiplying the number of the spot on the third leaf by ten. The figures in the bracket show the number of the leaves tested. The ratio implies the infection percentage in each group when the control group is taken as 100. The 2nd leaf, 3rd leaf, etc. refer to the second, third, etc. leaf counted from below.)

Thus, Humidin was confirmed to be active against *Colletotrichum lagenarium*.

Similar tests may be carried out with other respect to the same or other microorganism on the same or other test plants.

In connection with the use of Humidin in controlling plant diseases, it is pertinent to note that Humidin is stable at ordinary temperature, regardless of the pH of the medium, and resistant to direct rays of the sun. Thus, when for example a phosphate buffer (pH 5.7 and 8) containing 1 mg./ml. of Humidin was left standing for two months at the window, the activity was not lowered at all. Also, the activity was not lowered by addition of a wetting agent, spreader and adhesive which are used in common agricultural chemicals.

As an agricultural chemical, Humidin may be used in crude state, not to speak of pure state. In some cases, the extract of the culture broth is also usable. When a crude product or an extract is used, their purity does not matter, so long as the impurities contained in them are not harmful to plants and do not prevent the contact of Humidin with plants. The content of Humidin in the preparations should be determined according to the kind of the plants and pathogenic microorganisms, and weather. When Humidin is used in liquid form, the liquid should preferably contain over 10 mcg./ml. of Humidin. The preparations of Humidin are used by making them adhere to the surface of the plant or penetrate into the plant tissue. When they are to be applied to the surface of the plant, a volume sufficient to cover the whole plant is necessary. When they are to be caused to penetrate into the plant tissue, they are brought in contact with roots, foliar surface, stems, etc. Use of a duster, sprayer or mist sprayer is recommended to spray the preparations uniformly on the plant body. In general, the preparations in the present invention are caused to adhere to the surface of the plant body to keep a high content of Humidin on the surface of the plant body. Also fruits may be brought in contact with the preparations to make the latter stick to the fruits or penetrate into them. Also, Humidin may be used in powder form, and it may be made up into the form of tablets. When Humidin is used in liquid form, it is diluted with water or an organic solvent into the form of a solution, emulsion or suspension.

As the organic solvent there are used hydrophilic solvents such as acetone and alcohol, but non-hydrophilic solvents such as cyclohexanol, xylene and petrolic solvents may also be employed. When the non-hydrophilic solvents are used, a surface active agent or distribution agent is generally added. An organic solvent solution may be used as such, but it is generally expensive. When a solution of Humidin in an organic solvent is diluted with water, an emulsion is generally formed. Since the greater part of the emulsion is water, it is cheap and, in addition, has satisfactory properties for use as agricultural chemical.

When Humidin is used in powder form, mineral or vegetable powder is used as diluent or carrier. As the mineral powder there are employed talc, clay, diatomaceous earth, Japanese acid clay, active clay, aleurone, volcanic ashes, boric acid, calcium carbonate, magnesium carbonate, etc. And as vegetable powder used wood powder, for example, may be used. These powder preparations may be processed into tablets. In making tablets it is convenient to add an excipient which helps the components distribute in the solvent. When the tablets are used after being distributed in water, soluble starch, pectins, sodium alginate, polyvinylalcohols, methylcellulose, the sodium salt of carboxymethylcellulose, sugars, polyhydric alcohol, casein, etc. are convenient excipients.

In any form mentioned above, other substances such as a cohesive supplement, solubilizer, manure, growth promoting agent, dyestuff and disinfectant may be added.

EXAMPLE 5

A powder preparation of Humidin is prepared by diluting the crystalline Humidin (7500 u./mg.) with a 95:5 mixture of talc and kaolin.

| | Content of Humidin (mg./g.) | Antibiotic activity (u./mg.) | |
|---|---|---|---|
| | | Calcd. | Found. |
| 100 times dilution | 10.0 | 75.0 | 75.0 |
| 200 times dilution | 5.0 | 37.5 | 38.0 |
| 400 times dilution | 2.5 | 18.8 | 20.0 |

EXAMPLE 6

Emulsion preparations containing the crystals of Humidin (7500 u./mg.) as active component are made up as follows:

| Components | A | B | C |
|---|---|---|---|
| Humidin | 5 | 5 | 5 |
| Cyclohexanone | 25 | 25 | 35 |
| Xylene | 50 | 60 | 50 |
| Surface active agent | 20 | 10 | 10 |

In all cases, the components are mixed in the above order and diluted with water before use.

The results of tests of the emulsion preparations on the anthracnose of cucumber and peach and on the powdery mildew of wheat are shown in Tables 10, 11, 12 and 13.

TABLE 10

| Treatment | Concentration | Addition | Infected percentage, percent | Ratio | Protective effect, percent |
|---|---|---|---|---|---|
| Control | | | 57.8 | 100.0 | 0 |
| No. 1 | ×500 | | 33.1 | 57.2 | 42.8 |
| No. 1 | ×500 | Lime casein, 0.1% | 16.8 | 29.1 | 70.9 |
| No. 2 | ×500 | | 17.7 | 30.6 | 69.4 |
| No. 2 | ×500 | Lime casein, 0.1% | 12.1 | 20.9 | 79.1 |
| No. 3 | ×500 | | 18.1 | 31.4 | 68.7 |
| No. 3 | ×500 | Lime casein, 0.1% | 14.6 | 25.3 | 74.6 |
| No. 4 | ×500 | | 13.8 | 23.9 | 76.1 |
| No. 4 | ×500 | Lime casein, 0.1% | 17.5 | 30.3 | 69.7 |
| No. 5 | ×500 | | 14.6 | 25.3 | 74.7 |
| No. 5 | ×500 | Lime casein, 0.1% | 17.2 | 29.8 | 70.2 |

TABLE 11

| Treatment | Leaf position | Infected percentage, percent | Ratio | Protective effect, percent | Extension rate, percent |
|---|---|---|---|---|---|
| Control | I | 9.8 | 100.0 | 0 | 100.0 |
| | II | 17.4 | 100.0 | 0 | 100.0 |
| | III | 3.9 | 100.0 | 0 | 100.0 |
| No. 2×100 | I | 7.0 | 71.4 | 28.6 | 90.9 |
| | II | 4.3 | 24.7 | 75.3 | 89.0 |
| | III | 0.8 | 21.3 | 78.7 | 66.9 |
| No. 2×500 | I | 2.6 | 27.0 | 73.0 | 81.9 |
| | II | 1.7 | 9.8 | 90.2 | 70.8 |
| | III | 0.7 | 18.9 | 81.1 | 92.7 |

TABLE 12

| Treatment | No. of fruits observed | No. of fruits infected | No. of infected resins |
|---|---|---|---|
| Control | 5 | 4 | 43 |
| No. 1×500 | 5 | 1 | 2 |
| No. 3×500 | 5 | 1 | 2 |

TABLE 13

| Date | 10 June | 12 June | 15 June |
|---|---|---|---|
| Treatment | 2 | 2.5 | 2.6 |
| Control | 5 | 5 | 4.9 |

In the preceding tables:

No. 1 means that a non-ionic and an anionic surface active agent were used as surface active agent in A.

No. 2 means that the same surface active agents as in No. 1 were used in B.

No. 3 means that an anionic surface active agent was used in A.

No. 4 means that the same surface active agents as in No. 1 were used in C.

No. 5 means that a non-ionic surface active agent was used in A.

(i) Test on the anthracnose of cucumbers planted in unglazed pots with a diameter of ca. 9 cm. (Table 10):

The test plants belong to the race susceptible to the disease and had 2–3 leaves, respectively.

Each of the plants was sprayed with 6 ml. of the emulsion and, after drying in the air, inoculated with the pathogenic microorganism. It was kept in a moist chamber at 30° C. overnight and then transferred in a greenhouse at 24–35° C. Observation was conducted after a week. The rate of the disease was calculated from the number of the spots on the second leaf.

(ii) Test on the anthracnose of cucumbers planted in unglazed pots with a diameter of ca. 15 cm. (Table 11):

The test plants belong to the race susceptible to the disease and had 8–10 leaves, respectively.

Test was conducted on 1–3 leaves with roughly the same size. In the table, the extension rate means the extension of the infected region after attack of the disease.

(iii) Test on the anthracnose of the peach in the laboratory (Table 12):

Fruits of the peach were sprayed with an emulsion containing 100 mcg./ml. of Humidin, and inoculated with conidia of Gloeosporium laeticolor next day. The fruits were left standing at a suitable temperature for 7 days, and the number of the infected fruits and that of spots were investigated.

(iv) Test on the powdery mildew of the wheat in the nursery (Table 13):

The powdery mildew of wheat seedlings which grew from the seeds sown on May 14 were treated with an emulsion prepared by diluting No. 1 in Example 6 250 times (content of Humidin in 200 mcg./ml.). The seedlings were sprayed three times with 180 ml. per square meter of the emulsion on May 29, June 3 and 11. And the degree of the disease was observed three times on June 10, 12 and 15. The figures in the table show the index decided by the size of the infected region. And no infection is taken for 0, slight infection for 1, clear infection for 3, and remarkable infection for 5. As seen from the table the disease can be prevented ca. 50% by treatment with the Humidin emulsion.

The following table shows the compositions used in Examples 7 to 15 inclusive:

TABLE 14

| | A | B | C | D | E | F |
|---|---|---|---|---|---|---|
| Humidin | 2.5 | 5 | 5 | 2.5 | 2.5 | 5 |
| Cyclohexanone | 25 | 25 | 25 | 35 | 25 | 35 |
| Xylene | 62.5 | 50 | 50 | 52.5 | 52.5 | 50 |
| Surface active agent (1)[1] | 10 | | | 10 | | 10 |
| Surface active agent (2)[2] | | 20 | | | | |
| Surface active agent (3)[3] | | | 20 | | 20 | |

[1] Surface active agent (1); the principal components are alkylarylsulfonate and polyoxyethylene alkylphenylether.
[2] Surface active agent (2); the principal component is polyoxyethylene nonylphenylether.
[3] Surface active agent (3); the principal component is dialkyl sulfosuccinate.

EXAMPLE 7

Rice plant (*Oryza sativa* L.)—

(a) Downy mildew: Seeds of rice were dipped first in water at 30° C. for 2 days, then in 125, 250 and 500 times dilutions of 2.5% emulsion of Humidin-A for 12 hours, and finally germinated at 30° C. The germinated seeds were inoculated with *Phytophthora macrospora* (Sacc.) Ito et Tanaka and transplanted on the field. Counting the number of diseased plants, a remarkable control effect was observed in the treated sections as compared with the untreated sections.

(b) Sheath spot: A species of aquatic rice grown on the field was caused to be attacked by disease by inoculation with *Hypochnus sasakii* Shirai cultivated on the ricestraw, and then sprayed with 300 and 700 times dilutions of 5% Humidin-B emulsion. No injury of the plant by the agent was observed, but a remarkable static effect on the development of the disease was found in the treated sections, compared with the untreated sections.

EXAMPLE 8

Grape (*Vitis vinifera* L.), anthracnose—

Fruits of even ripened level were selected from a bunch of grapes and after being sprayed with 100 mcg./ml. of 5% Humidin-C emulsion, were left standing in a greenhouse for 24 hours and then inoculated with *Glomerella cingulata* Spauld et Schr. The rate of attack of the disease was only 21%, while it was 71% in the untreated fruits.

EXAMPLE 9

Japanese persimmon (*Diospyros kaki* Thumb. var, *domestica* Makino), anthacnose—

Ripe fruits were sprayed with 200 mcg./ml. 5% Humidin-C emulsion and, after being air-dried for 24 hours, inoculated with 10–20 drops per 2 fruits of a suspension of *Gloesporium kaki* Ito. No attack of the disease was found on the treated fruits, while all of the untreated fruits were attacked by the disease.

EXAMPLE 10

Peach (*Prunus persica* Rhed. and *P. communis* L.), anthracnose—

Adult plants grown on the field were selected as the test plants. After thinning out of diseased fruits at thinning season, the fruits were covered and the plants were sprayed with 6 liters per plant of 250 times dilution of 2.5% Humidin-D emulsion seven times at 10 day intervals. The rate of attack of the disease was 28.9%, while it was 39.1% in the untreated plants. No injury of the fruits by the agent was observed.

EXAMPLE 11

Cucumber (*Cucurbita sativus* L.), anthracnose—

The test plants were cultivated without composts in a green-house and sprayed with 125 and 62.5 times dilutions of 2.5% Humidin-E emulsion at 2 or 3 and 3 or 4 leaves stages, respectively. 2.75 and 1.75 symptoms per leaf were observed, respectively, while 4.10 symptoms per leaf were found in the control.

EXAMPLE 12

Kidney bean (*Phaseolus vulgaris* L.), anthracnose—

The plants cultivated without composts on a field were sprayed with 250, 125, 62.5 times dilutions of 2.5% Humidin-E emulsion and, after being air-dried, sprayed with a suspension of *Colletotrichum lindemuthianum* (Sacc. et Magn.) Br. et Can. Ten days later, the symptoms on the leaves and pods were observed to give the results shown in Table 15. The figures in the table show the number of symptoms per leaf and per pod.

TABLE 15

| Concentration | Leaf | Pod |
| --- | --- | --- |
| ×250 | 0.35 | 3.43 |
| ×125 | 0.10 | 2.39 |
| ×62.5 | 0.13 | 2.59 |
| Control | 0.57 | 5.12 |

EXAMPLE 13

Garden pea (*Pisum sativum* L.)—

(a) Foot rot: The plants measuring about one meter in height were sprayed with a suspension of *Mycosphaella pinodes* (B. et Blox.) Stone and then with the agent. On the sixth day after spraying the agent, the symptoms per leaf were counted. And at the same time, the agent was again sprayed and one week later, observation was made once more to give the results shown in Table 16.

TABLE 16

| | 1st time | 2nd time |
| --- | --- | --- |
| 2.5% Humidin-E emulsion, ×300 | 0.16 | 0.33 |
| 2.5% Humidin-E emulsion, ×500 | 0.09 | 1.29 |
| 5% Humidin-F emulsion, ×500 | 0.20 | 0.47 |
| 5% Humidin-F emulsion, ×600 | 0.07 | 0.52 |
| Control | 0.24 | 2.62 |

(b) Botrytis rot: Leaves of the plants grown in pots filled with sterile soil were inoculated with an agar block of the pathogen (*Botrytis cinerea* Pers.) and one day later, the plants were sprayed with Humidin-E emulsions. The rate of the diseased plants was as shown in Table 17.

TABLE 17

Diseased plants (percent)
2.5% Humidin-E emulsion, ×300 _____ 44.5
2.5% Humidin-E emulsion, ×500 _____ 77.8
Control _____ 100.0

EXAMPLE 14

Lettuce (*Lactuca sativa* L.), Botrytis rot: Leaves of the plants grown in pots filled with sterile soil were inoculated with an agar block of the pathogen (*Botrytis cinerea* Pers.), and one day later the plants were sprayed once with Humidin-E or Humidin-F emulsion. The results are shown in Table 18.

TABLE 18

Diseased plants (percent)
2.5% Humidin-E emulsion, ×300 _____ 73.9
2.5% Humidin-E emulsion, ×500 _____ 68.6
5% Humidin-F emulsion, ×500 _____ 60.8
Control _____ 90.0

EXAMPLE 15

Tomato (*Lycopersicon esculentum* Mill)—

(a) Blight: The plants were sprayed with 5% Humidin-F emulsion in a dilution of 200 mcg./ml., and the next day, inoculated with *Phytophthora paracitica* Bary. The effect of inhibiting the disease was confirmed on the third day even with the naked eye.

(b) Fusarium wilt and leaf mould: Seedlings of tomato were transplanted in pots of a diameter of 15 cm., filled with soil inoculated with *Fusarium lycopersici* Sacc. The plants were sprayed or the soil was irrigated with Humidin-E or Humidin-F emulsion three times at a week intervals. The rates of Fusarium wilt and naturally infected leaf mould (Infection from *Botrytis cinerea* Pers.) were observed to give the results shown in Table 19.

TABLE 19

| | Fusarium wilt, percent | | Leaf mould, percent |
| --- | --- | --- | --- |
| | Plant sprayed | Soil irrigated | |
| 2.5% Humidin-E emulsion, ×200 | 88.7 | 74.8 | 12.6 |
| 2.5% Humidin-E emulsion, ×300 | 55.0 | 24.8 | 14.0 |
| 5% Humidin-F emulsion, ×400 | 77.7 | 16.5 | 32.3 |
| 5% Humidin-F emulsion, ×600 | 88.7 | 8.3 | 13.3 |
| Control | 100 | 83.0 | 37.6 |

Having thus disclosed the invention, what is claimed is:

1. The method of controlling plant disease which comprises treating at least part of the plant with an effective but not phytotoxic amount of Humidin, which, in the pure state, has a melting point of 145–146° C. (decomp.), crystallizes as colorless hexagonal plates, contains the elements carbon, hydrogen and oxygen including about 63.03–63.51% C and about 8.31–8.66% H, has an optical rotation:

$[\alpha]_D^{34} = -6°$ (c.=1, ethanol)
$[\alpha]_D^{25} = -10°$ (c.=1, acetone)
$[\alpha]_D^{25} = -8°$ (c.=1, dioxane)

has an IR-spectrum as shown on the accompanying drawing, has a UV spectrum with absorption maxima in the vicinities of 245 mµ and 285 mµ, and has the following solubility characteristics: readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride.

2. The method of controlling rice plant infection which comprises treating the rice plant with an effective but not phytotoxic amount of Humidin, which, in the pure state, has a melting point of 145–146° C. (decomp.), crystallizes as colorless hexagonal plates, contains the elements carbon, hydrogen and oxygen including about 63.03–63.51% C and about 8.31–8.66% H, has an optical rotation:

$$[\alpha]_D^{34} = -6° \text{ (c.}=1, \text{ ethanol)}$$
$$[\alpha]_D^{25} = -10° \text{ (c.}=1, \text{ acetone)}$$
$$[\alpha]_D^{25} = -8° \text{ (c.}=1, \text{ dioxane)}$$

has an IR-spectrum as shown on the accompanying drawing, has a UV spectrum with absorption maxima in the vicinities of 245 mµ and 285 mµ, and has the following solubility characteristics: readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride.

3. The method of controlling anthracnose of plants which comprises treating the plant with an anthracnose-controlling but not phytotoxic quantity of Humidin, which, in the pure state, has a melting point of 145–146° C. (decomp.), crystallizes as colorless hexagonal plates, contains the elements carbon, hydrogen and oxygen including about 63.03–63.51% C and about 8.31–8.66% H, has an optical rotation:

$$[\alpha]_D^{34} = -6° \text{ (c.}=1, \text{ ethanol)}$$
$$[\alpha]_D^{25} = -10° \text{ (c.}=1, \text{ acetone)}$$
$$[\alpha]_D^{25} = -8° \text{ (c.}=1, \text{ dioxane)}$$

has an IR-spectrum as shown on the accompanying drawing, has a UV spectrum with absorption maxima in the vicinities of 245 mµ and 285 mµ, and has the following solubility characteristics: readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride.

4. The method of controlling plant diseases which comcomprises treating seeds of the plant with an effective but not phytotoxic amount of Humidin, which, in the pure state, has a melting point of 145–146° C. (decomp.), crystallizes as colorless hexagonal plates, contains the elements carbon, hydrogen and oxygen including about 63.03–63.51% C and about 8.31–8.66% H, has an optical rotation:

$$[\alpha]_D^{34} = -6° \text{ (c.}=1, \text{ ethanol)}$$
$$[\alpha]_D^{25} = -10° \text{ (c.}=1, \text{ acetone)}$$
$$[\alpha]_D^{25} = -8° \text{ (c.}=1, \text{ dioxane)}$$

has an IR-spectrum as shown on the accompanying drawing, has a US spectrum with absorption maxima in the vicinities of 245 mµ and 285 mµ, and has the following solubility characteristics: readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride prior to planting the said seeds.

5. The method of controlling plant disease on fruit which comprises spraying the fruit with an emulsion containing as essential disease-controlling ingredient Humidin, which, in the pure state, has a melting point of 145–146° C. (decomp.), crystallizes as colorless hexagonal plates, contains the elements carbon, hydrogen and oxygen including about 63.03–63.51% C and about 8.31–8.66% H, has an optical rotation:

$$[\alpha]_D^{34} = -6° \text{ (c.}=1, \text{ ethanol)}$$
$$[\alpha]_D^{25} = -10° \text{ (c.}=1, \text{ acetone)}$$
$$[\alpha]_D^{25} = -8° \text{ (c.}=1, \text{ dioxane)}$$

has an IR-spectrum as shown on the accompanying drawing, has a UV spectrum with absorption maxima in the vicinities of 245 mµ and 285 mµ, and has the following solubility characteristics: readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride.

6. The method of controlling plant disease which comprises incorporating into the soil on which the plant is growing an effective but not phytotoxic quantity of Humidin, which, in the pure state, has a melting point of 145–146° C. (decomp.), crystallizes as colorless hexagonal plates, contains the elements carbon, hydrogen and oxygen including about 63.03–63.51% C and about 8.31–8.66% H, has an optical rotation:

$$[\alpha]_D^{34} = -6° \text{ (c.}=1, \text{ ethanol)}$$
$$[\alpha]_D^{25} = -10° \text{ (c.}=1, \text{ acetone)}$$
$$[\alpha]_D^{25} = -8° \text{ (c.}=1, \text{ dioxane)}$$

has an IR-spectrum as shown on the accompanying drawing, has a UV spectrum with absorption maxima in the vicinities of 245 mµ and 285mµ, and has the following solubility characteristics: readily soluble in acetone and dioxane, soluble in ethyl acetate and hot ethanol, sparingly soluble in n-butanol, ether and cold ethanol, hardly soluble in methanol, benzene and cold water, and almost insoluble in petroleum ether and carbon tetrachloride.

References Cited in the file of this patent

UNITED STATES PATENTS

| | | |
|---|---|---|
| 2,720,272 | Pidacks | Oct. 18, 1955 |
| 2,777,791 | Visor et al. | Jan. 15, 1957 |
| 2,801,950 | Tate | Aug. 6, 1957 |

OTHER REFERENCES

Proc. Japan Acad. Sci. 32: 648 et seq., 1956, through Applied Microbiology 6: 1, p. 77, January 1958.

Waksman: Bacteriological Reviews, 21: 1, March 1957, pages 4–5.

Sneath: J. Gen. Microbiol., 17 pages 184–200, August 1957.